United States Patent Office 3,339,014
Patented Aug. 29, 1967

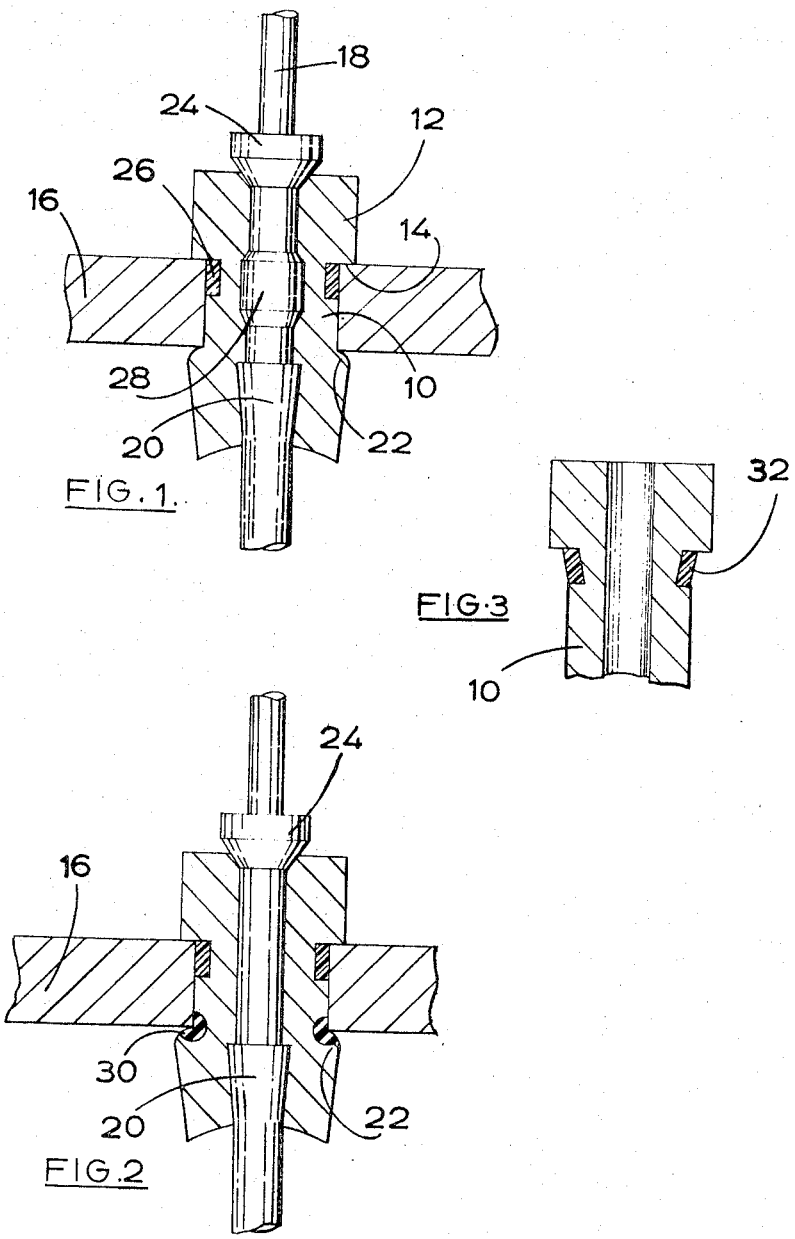

3,339,014
FITTING FOR ATTACHMENT TO
PERFORATED MEMBERS
Robert Frederick Oxley, Priory Park,
Ulverston, England
Filed Oct. 19, 1965, Ser. No. 497,974
Claims priority, application Great Britain, Nov. 3, 1964,
44,687/64
6 Claims. (Cl. 174—153)

ABSTRACT OF THE DISCLOSURE

A fitting having a bushing of polytetrafluoroethylene that is insertable partially into the perforation of the plate. When in the perforation, a silicone rubber seal in a peripheral groove of the bushing registers with the internal surface of the perforation. A spigot having enlarged cross-sectional regions is inserted in the bushing and expands the bushing to lock the bushing in the perforation and to force the seal into sealing engagement with the perforation.

---

This invention concerns fittings for attachment to perforated members.

Fittings for attachment to perforated members have already been proposed, for example for use in electrical equipment as a lead-through insulator and conductor assembly or as an insulated stand-off terminal; and also for use for purely mechanical purposes, for providing an attachment point to a perforated member.

The invention seeks to provide an improved attachment for use as a gastight seal under conditions of vacuum and pressure.

According to the present invention, in a fitting wherein the introduction of a spigot into the bore of a deformable bush for passing through a hole in a perforated member expands a part of the bush projecting through the hole to lock the bush on said member, the bush is additionally formed with at least one peripheral groove housing a seal which is urged into sealing engagement with the wall of the hole as the spigot is pushed into the bush.

More particularly, the present invention provides a fitting for attachment to a perforated member comprising a bush of deformable material and having stop means adjacent one of its ends, said bush being dimensioned to pass part way through a perforation in said member to an extent determined by said stop means and said stop means being positioned to enable the other end of said bush to project beyond said perforation on the other side of said member, an annular seal arranged in a groove formed around said bush between said stop means and said other end of said bush, the annular seal being so positioned along the length of said bush as to register at least in part with the thickness of said perforated member when said bush is fitted therein, a spigot for introduction into the bore of the bush and having bush deforming means intermediate its ends and bigger than said bore, and a projection on said spigot intermediate said deforming means and the end of the spigot remote from that which is introduced into said bore, whereby said spigot is enabled to be passed into said bore to a limit determined by said projection and said deforming means locks said bush in said perforated member and urges the annular seal into sealing engagement with the wall of said perforation.

The bush deforming means is preferably an enlargement of the spigot cross-section which expands the bush as the spigot is pushed into it, thus causing the annular seal to mate with the wall of the perforation. The same enlargement may be arranged to lock the bush in the perforation, or a separate, axially spaced enlargement may be provided for this purpose.

Figure 4:
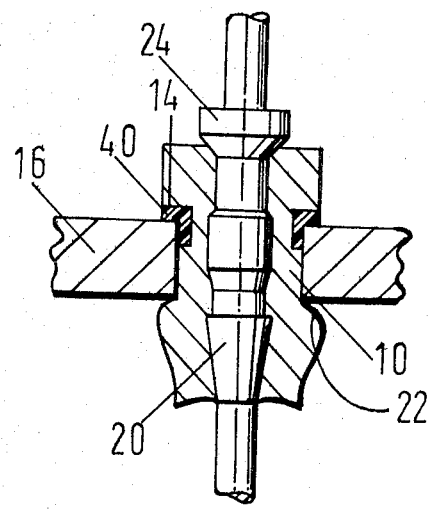
Figure 5:
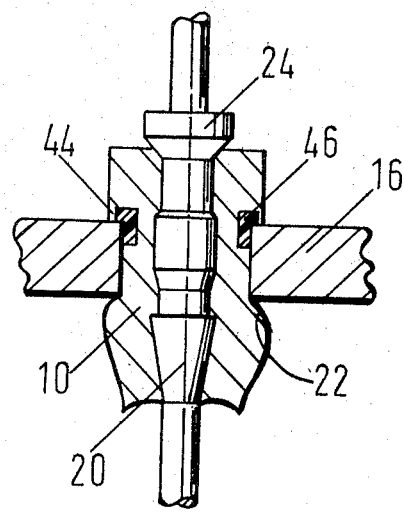

The invention will be described further, by way of example, with reference to the accompanying drawings, in which:

FIG. 1 is an axial section through one fitting embodying the invention showing the fitting mounted on a perforated member, FIG. 2 is a similar section of another embodiment of the invention, FIG. 3 is a sectional detail of an alternative form of bush, FIG. 4 is a section of a further embodiment of the invention, and FIG. 5 is a section of a still further embodiment of the invention.

In the fitting shown in FIG. 1, an axially bored bush 10 has an enlarged diameter head portion 12 which cooperates with the remaining, smaller diameter part of the bush to define a shoulder 14 constituting a stop means for limiting the extent to which the bush can be pushed into a hole in a perforated member 16. Typically, the member 16 may be a chassis or other mounting plate for electronic equipment, with the bush 10 made of a deformable, insulating plastics material, such as polytetrafluoroethylene.

The bush 10 projects from the side of the member 16 opposite to the enlarged head 12 and is locked in the member 16 by passing a spigot 18 (such as an electrical conductor) through the bore of the bush to an extent such that a frustoconical enlargement 20 comes to lie beyond the hole in the member 16 and expands the projecting end of the bush radially out beyond the periphery of the hole, as shown at 22, thereby preventing the bush from being withdrawn. A conical flange or other projection 24 is formed on the spigot 18 intermediate the enlargement 20 and the end of the spigot remote from that by which it is introduced into the bush 10, and serves both to limit the extent to which the spigot can enter the bush and relatively to position the enlargement 20 and bush 10 for proper formation of the expanded end 22.

Immediately below the shoulder 14, the bush 10 is formed with an annular groove in which is received a silicone rubber seal 26. Thus, when the bush is placed in the perforated member 16, the seal 26 lies within the thickness of member 16, adjoining the wall of the hole in the latter. The spigot 18, intermediate the projection 24 and enlargement 20, is formed with a further enlargement 28, of a generally cylindrical shape, with the result that, when the spigot is passed into the bush, the latter is radially expanded in the region of the cylindrical enlargement 28 and compresses the annular seal 28 into tight sealing engagement with the wall of the hole. The fitting comprising the bush, spigot and seal is thus suited for use in conditions where differential pressures exist on the two opposite sides of the member 16.

FIG. 2 shows an alternative construction, in which the same enlargement is used both to lock the bush in the perforated member and to achieve the desired gas-tight seal. In this embodiment of the invention, the bush is grooved at a region forming part of the eventually expanded end 22 to receive a seal 30, while the spigot omits the cylindrical enlargement 28 of the former construction, and uses only the enlargement 20 to radially expand the end 22. When this expansion takes place, it will be seen that the seal 30 engages the lower boundary of the hole in the member 16 to seal snugly against both the wall of the hole and against the adjoining face of the member 16.

In either of the embodiments of the invention described above, provision may be made for a part of the seal to project or to be squeezed out of the groove in the bush, so that when the latter is expanded, the exposed part of the seal is trapped between the bush and the contiguous wall of the hole in member 16. One way of achieving this is shown in FIG. 3, wherein the seal receiving groove in the bush 10 will be seen to have a tapered section, thus causing the upper part of the seal 32 to project beyond the periphery of the smaller diameter portion of the bush.

A further embodiment of the invention is illustrated in FIG. 4 of the drawings in which the seal is shaped for engagement with both the wall of the hole and the adjoining face of the member 16. To this end the seal is formed with a peripheral flange portion 40 having a diameter equal to that of the head 12 of the bush 10, this flange portion 40 being gripped between the shoulder 14 and the contiguous face of the member 16 when the bush 10 is inserted therein. The remaining portion 42 of the seal may be considered as corresponding to the seal 26 of FIG. 1, which is received in the annular groove formed in the bush 10 immediately adjacent the shoulder 14, and is located between the bush 10 and the wall of the hole in the member 16 when the bush is inserted therein.

In the embodiment of FIG. 4, the flange portion 40 cooperates with the shoulder 14 to constitute the stop means for limiting the extent to which the bush may be pushed into the hole in the member 16. This arrangement, however, may impose undue stress on the flange portion of the seal and in the embodiment of FIG. 5, the advantages of the improved sealing achieved by the use of a seal having a flange portion are obtained without the flange portion being unduly stressed. In this embodiment the shoulder 14 is formed with a peripheral lip 44 which serves to abut the member 16 and constitutes said stop means. A seal 46, similar in cross-sectional shape to the seal in the embodiment of FIG. 4, is housed in an annular groove in the bush the flange portion of the seal being disposed within the annular space defined between the peripheral lip 44 and the body of the bush, while the remaining portion of the seal lies between the bush and the contiguous wall of the hole in the member 16.

I claim:
1. A fitting for attachment to a perforated member comprising a bush of deformable electrical insulating material having stop means adjacent one of its ends, said bush being dimensioned to pass part way through a perforation in said member to an extent determined by said stop means, said stop means being positioned so that the other end of said bush projects beyond said perforation, an annular groove formed around said bush between said stop means and said other end of said bush, said groove being positioned along the length of the bush so as to register at least in part with the thickness of said perforated member when said bush is fitted therein, an annular seal arranged in said groove, a spigot of electrical conducting material for introduction into the bore of the bush, the spigot including a frusto-conical shaped enlargement of the spigot cross-section so positioned along the length of the spigot that when the spigot is located within the bore, the frusto-conical enlargement lies axially beyond the edge of the member defining the perforation, to expand the projecting end of the bush radially out just beyond said edge defining said perforation, a projection on said spigot intermediate said frusto-conical shaped enlargement and the end of the spigot remote from that which is introduced into said bore, the extent to which the spigot may be introduced therein being determined by said projection and a substantially cylindrical enlargement of the spigot cross-section intermediate said frusto-conical shaped enlargement and said projection on said spigot, said cylindrical enlargement being positioned along the length of the spigot so that when the spigot is located within the bore, said cylindrical enlargement registers at least in part with said groove to expand the portion of the bush containing the groove and thereby urge the seal into sealing engagement with said perforated member.

2. A fitting as claimed in claim 1, in which the bush is formed from a deformable plastic material having properties substantially equal to those of polytetrafluoroethylene.

3. A fitting as claimed in claim 2 in which the annular seal is formed from silicon rubber.

4. A fitting for attachment to a perforated member comprising a bush of deformable electrical insulating material adapted for insertion partially through a hole in the perforated member, two peripheral grooves formed in said bush, axially spaced apart and positioned therealong so as to register in part with the thickness of the perforated member and to extend axially beyond the two edges of said member which define said hole when the bush is fitted therein, two annular sealing rings, one housed in each of said peripheral grooves, a spigot of electrical conducting material, said bush defining a bore to receive the spigot, said spigot including a frusto-conical shaped enlargement of its cross-section, so positioned along the length thereof that when the spigot is located within said bore the enlargement lies axially beyond one edge of said member which defines said hole, to expand one of the projecting ends of the bush radially out just beyond said one edge defining said hole to prevent the bush from being withdrawn and to urge the two sealing rings into sealing engagement with the two edges defining said hole and said spigot being formed with a projection intermediate said frusto-conical enlargement of its cross-section and the end of the spigot remote from that which is introduced into said bore the extent to which the spigot may be introduced into the bore, being determined by said projection.

5. A fitting as claimed in claim 4 in which the bush is formed from a deformable plastic material having properties substantially equal to those of polytetrafluoroethylene.

6. A fitting as claimed in claim 5 in which each annular seal is formed from silicon rubber.

References Cited

UNITED STATES PATENTS

| 1,029,715 | 6/1912 | Robinson. | |
|---|---|---|---|
| 2,208,620 | 7/1940 | Baisch. | |
| 2,525,799 | 10/1950 | Hecker | 285—347 X |
| 2,577,009 | 12/1951 | Frantz | 285—192 X |
| 2,885,949 | 5/1959 | Curtis et al. | 285—231 X |
| 2,896,008 | 7/1959 | Putz | 339—94 |
| 2,911,460 | 11/1959 | Oxley | 174—153 |
| 3,095,470 | 6/1963 | Dozier | 174—153 |

FOREIGN PATENTS 909,774  11/1962  Great Britain.

CARL W. TOMLIN, Primary Examiner.

THOMAS F. CALLAGHAN, Examiner.